United States Patent [19]

Zakich

[11] Patent Number: 4,944,669
[45] Date of Patent: Jul. 31, 1990

[54] HIGH TONNAGE RIM PRESS

[75] Inventor: Paul Zakich, Akron, Ohio

[73] Assignee: The Dow Chemical Company, Midland, Mich.

[21] Appl. No.: 318,574

[22] Filed: Mar. 3, 1989

[51] Int. Cl.$^5$ .............................................. B29C 45/03
[52] U.S. Cl. .................................. 425/589; 425/595; 425/450.1; 425/451.2; 425/451.9
[58] Field of Search .................. 425/450.1, 595, 451.2, 425/451.9, 589

[56] References Cited

U.S. PATENT DOCUMENTS

| | | | |
|---|---|---|---|
| 2,711,561 | 6/1955 | Studli | 425/149 |
| 2,916,768 | 12/1959 | Quere et al. | 425/451.2 |
| 3,120,039 | 2/1964 | Stubbe et al. | 164/342 |
| 3,346,924 | 10/1967 | Lombard | 425/419 |
| 3,940,930 | 3/1976 | Rosander | 60/375 |
| 3,972,668 | 8/1976 | Cessna, Jr. | 425/242 |
| 4,032,277 | 6/1977 | Linde et al. | 425/591 |
| 4,128,380 | 12/1978 | Jamann | 425/451.2 |
| 4,240,781 | 12/1980 | Flickinger et al. | 425/450.1 |
| 4,245,971 | 1/1981 | MacMillan | 425/47 |
| 4,247,278 | 1/1981 | Descrovi et al. | 425/408 |
| 4,273,524 | 6/1981 | Smith | 425/450.1 |
| 4,304,540 | 12/1981 | Hammon | 425/150 |
| 4,318,682 | 3/1982 | Larson et al. | 425/595 |
| 4,364,720 | 12/1982 | Ryder | 425/144 |
| 4,504,208 | 3/1985 | Kuramaji et al. | 425/595 |

FOREIGN PATENT DOCUMENTS

| | | |
|---|---|---|
| 1268822 | 5/1968 | Fed. Rep. of Germany . |
| 1704616 | 1/1971 | Fed. Rep. of Germany . |
| 2453000 | 5/1976 | Fed. Rep. of Germany . |
| 2295832 | 12/1974 | France ............................. 425/595 |
| 1166082 | 10/1969 | United Kingdom . |
| 1166083 | 10/1969 | United Kingdom . |
| 2090787 | 7/1982 | United Kingdom . |
| 2128541 | 5/1984 | United Kingdom . |

Primary Examiner—Willard Hoag

[57] ABSTRACT

A high tonnage reaction injection molding press has a fixed and a moveable mold plate for clamping a composite mold therebetween. A plurality of high pressure hydraulic cylinders are mounted on a carrier for the movable mold plate. Fluid actuated means move the carrier and movable plate to a locking position whereat the carrier is locked adjacent to the fixed plate. Short stroke connecting rods operated by the cylinders are then forced independently of each other into high tonnage connected engagement with the movable plate at a plurality of locations within the area of the mold to clamp the mold between the plates. The high tonnage force applied independently at each location assures that the junctures of the composite mold adjacent to said locations are positively sealed.

16 Claims, 3 Drawing Sheets

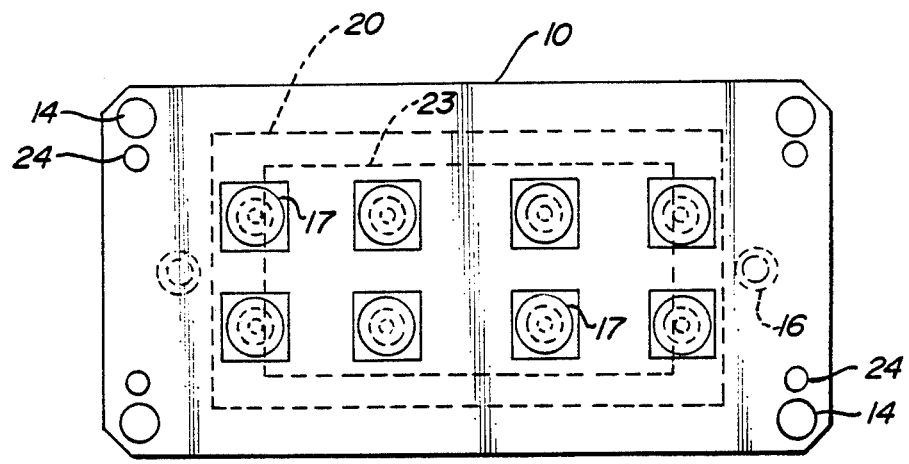
Fig-2
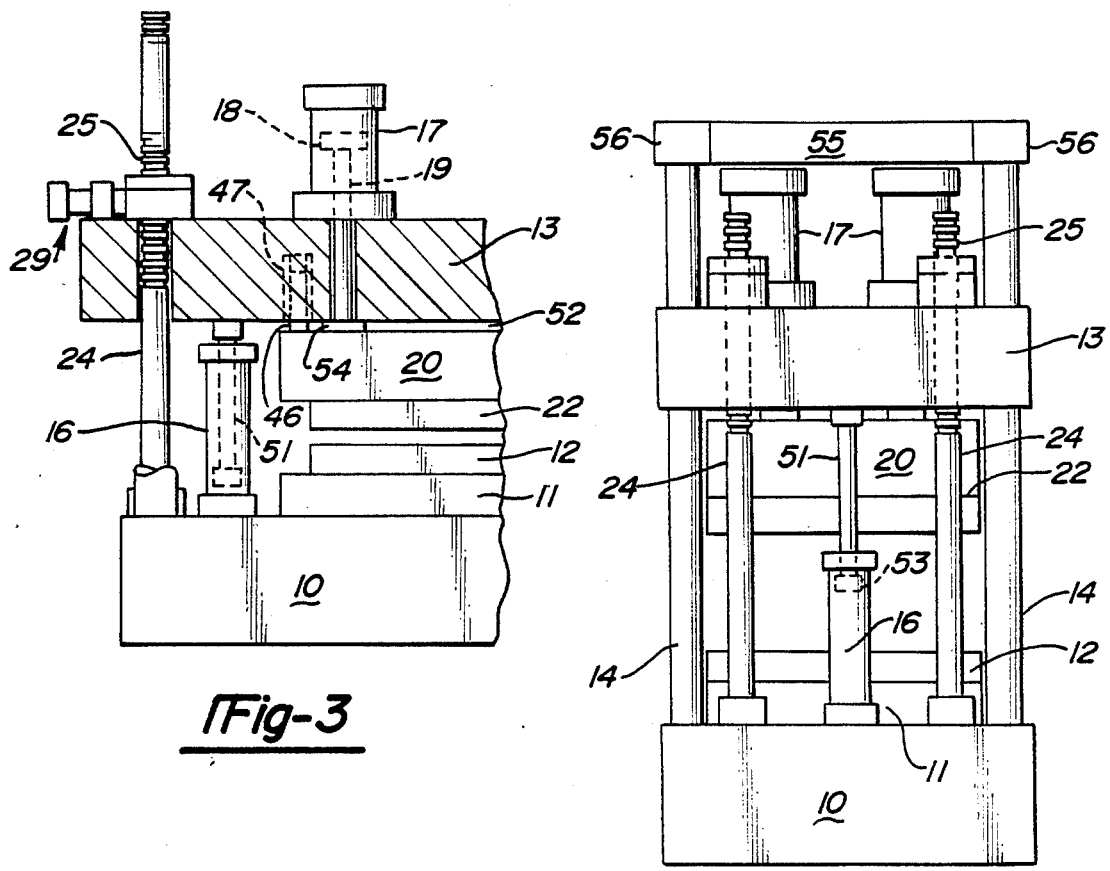
Fig-3
Fig-4

HIGH TONNAGE RIM PRESS

The present invention is concerned with an improved press which, though not limited to any specific size or use, is particularly suitable for the reaction injection molding (RIM) of large products requiring high pressure in a range of 500 to 1000 tons or more over a mold area of 50 square feet or more.

BACKGROUND OF THE INVENTION

In the typical RIM operation, a mold cavity formed by at least two mating mold parts is filled with reactive chemicals that are mixed and injected at high pressure into the mold cavity, wherein an exothermic polymerization reaction substantially increases the pressure within the cavity. During the reaction process, it is important to clamp the mold parts firmly together to prevent the material being molded from escaping at the junctures between the mold parts. The RIM of large products requires tremendous compression forces over a comparatively large area, such that conventional presses used for high tonnage RIM operations tend to warp or deform during the molding process. Although the press beds between which comparatively large mold parts are pressed comprise heavy rigid steel structures, it has not been economically feasible to provide such presses that will not deform. In consequence, the force applied to clamp the mold parts together is distributed unevenly over the area of the mold, enabling the extrusion of pressurized reacting chemicals through tiny spacings at the mold junctures. Such spacings on the order of a thousandth of an inch are significant, may result in improperly formed molded products, and in any event necessitate an additional operation to remove flash from the molded product.

Upon completion of the RIM process, high pressure must often be applied to "strip" the mold parts from the molded product, depending upon the latter's size and configuration.

Although the prior art relating to molding presses is extensive, very little of that art known to applicant is concerned with the problem of preventing or compensating for deformation of the press components. The Hammon U.S. Pat. No. 4,304,540, is typical of a conventional type of press that ignores the deformation problem and is thus limited to the molding of small products involving comparatively low pressure applications. The Hammon press provides stress or clamping rods 18 mounted at the corners of fixed and movable press beds or mold supports 12 and 24 respectively. A locking assembly 22 carried by the movable bed 24 clamps the serrations 21 of each rod 18 to lock the movable bed 24 adjacent to a molding position prior to application of a clamping force. Thereafter pressure is applied to the upper sides of pistons 57, FIG. 1, which are secured to the rod 18 to pull the latter and bed 24 downwardly in a clamping action to the molding position. After the molding operation, pressure is applied to the lower ends of pistons 57 to effect a stripping action by pushing the rods 18 upwardly.

Such a press is suitable for use only with comparatively small molds because under extremely high tonnage force, in addition to deformation of other press components, the locking rods 18 are stretched, usually non-uniformly. Although the corner portions of the beds 12 and 24 are tightly clamped together, their central portions when subjected to high tonnage molding conditions are insufficiently clamped to the extent that the high pressure moldable products extrude from the mold as flashing.

The Quere U.S. Pat. No. 2,916,768, recognizes the problem of deformation and the possibility of improperly aligned press components. It provides for independent adjustment of the corner mounted stress rods 5 and for the use of different pressures in the actuating cylinders 3 to compensate for such deformation. Such a mold requires sophisticated controls and at best can only minimize deformation when the press is used with comparatively small molds. Even if the clamping forces at the corners of the mold are equalized, the mold will still be subject to the disadvantages of the corner mounted clamping devices used by Hammon.

One type of press known to the art is concerned with the provision of a uniform distribution of molding force over the area of a mold. Such presses, variously known as bladder or pillow type presses, provide a high pressure chamber having a movable and usually deformable wall coextensive with a movable mold plate and deformable against the latter to clamp it toward a fixed mold plate during a molding operation. Typically high speed means are also provided for moving the movable plate and high pressure chamber in unison to and from a mold closed position whereat the movable mold plate is adjacent to the fixed mold plate and in position to carry out the molding operation upon the injection of pressurized fluid into the high pressure chamber.

Such presses are only suitable for molding products having comparatively small surface areas requiring a comparatively small total molding force, wherein deformation of the press components is not a problem and high pressure stripping is not required. The deformable wall of the high pressure chamber can only exert a unidirectional molding force and is thus not suitable for effecting high pressure stripping.

A typical pillow or bladder type press is disclosed in the Descrovi U.S. Pat. No. 4,247,278, which recognizes the problem of deformation of the mold plates and provides a fluid pressurized cylinder 77 having an axial end wall 76, FIGS. 1, 2, or 216, FIGS. 3, 4, sufficiently thin and flexible to conform to deformation of an adjacent mold plate when the cylinder 77 is pressurized during a molding operation. Descrovi et al, like other pillow or bladder type patents, is not suitable for high tonnage operation. At the outset, it does not enable high pressure stripping by the same pressure exerting system that provides the mold closing pressure. Also, the area of the deformable walls 76 and 216 must be strictly limited. Otherwise these walls will be ruptured if subjected to the high pressure RIM of a large product. The deformable wall must be sufficiently thin to conform to deflection of the adjacent mold carrier and must be sufficiently thick to prevent its destruction by the pressure within cylinder 77. Accordingly bladder or pillow type presses such as Descrovi et al must be operated within a comparatively limited range of clamping pressure.

SUMMARY OF THE INVENTION

The present invention is especially concerned with the problems resulting from the distortion of press components during high tonnage RIM operations involving large molds and provides an effective combination and arrangement of press components including a pair of plates movable with respect to each other to a clamping position for clamping a composite mold or die plate therebetween, as for example a multiple part mold for RIM, or stamping dies for forming a metal plate by a press operation. Force exerting means, such as a plurality of high pressure piston-cylinder assemblies, are mounted on a carrier for one of the plates. The other plate and carrier are movable with respect to each other to a locking position adjacent to the clamping position and are prevented from moving from the locking position by selective operation of locking means. The force exerting means comprise a plurality of connectors or rods extensible independently of each other in the direction from the carrier toward the one plate and connected thereto at a corresponding plurality of separate locations confined within the area of the mold clamped between the plates. The connectors are arranged so that when they are extended, each independently of the others, they force the one plate against the other plate at the clamping position.

Accordingly, in the event that some of the press components tend to deform during a high tonnage clamping operation, such that if any of the junctures between parts of a mold clamped between the plates are not tightly sealed, or if some portion of a member to be formed by the clamping action is not properly formed, the independently extensible connector connected to the one plate at the location adjacent to the unsealed juncture, or incompletely formed part of the clamped member, will continue its clamping movement until the mold parts are completely sealed, or until the entire member is properly formed.

Additionally the structure described herein preferably includes a sturdy fixed base that supports said other plate, which may be a fixed plate. A number of guide pillars or rods and stress or locking rods supported by the fixed base extend slideably through the carrier. The guide rods guide movement of the carrier to and from open positions of the press. The stress or locking rods provide a plurality of closely and uniformly spaced annular locking grooves or serrations selectively engageable with locking dogs carried by the carrier to lock the latter at the aforesaid locking position against movement with respect to the base and fixed plate during a high tonnage clamping and molding operation.

The locking rods when engaged by the locking dogs sustain the entire reaction force of a high tonnage clamping operation, such that the guide rods are unaffected by the clamping operation and their function in guiding the movement of the carrier is not hampered. Also the guide and locking rods are located outwardly of the area of the plates, such that the mechanism for operating the locking dogs may also be located outside of that area. Thus the force exerting means, such as the preferred high pressure cylinders, may be mounted on the carrier as closely together as desired within that area.

Preferably a pair of locking dogs associated with each locking rod are movable simultaneously in opposite directions to and from positions of locking engagement with their locking rod. A first spring interposed between positions fixed with respect to the carrier and one of the dogs of said pair yieldingly urges the one dog to its position of locking engagement. A second spring interposed between positions fixed with respect to the carrier and the other dog of said pair yieldingly urges the other dog to its position of locking engagement. A pair of force exerting members connected respectively with said dogs are movable simultaneously in said opposite directions to move the dogs simultaneously to their positions of locking engagement against the reaction of the springs. Also preferably a pair of spacers are provided for engaging portions fixed with respect to each dog and the carrier for blocking unlocking movement of the dogs at a predetermined limiting position.

The preferred high pressure cylinder and piston assemblies described herein also provide compact and readily controlled reversible means for effecting high pressure stripping where such is required, utilizing the same pressure source required for the high tonnage clamping. However other force exerting assemblies known to the art, such as toggle or electro-mechanical assemblies by way of example may be substituted for the high pressure cylinder-piston assemblies. Also, although the present invention is described herein in application with high tonnage RIM of large products, such as polyurethane parts and the like, the press described may be used in other applications where a plurality of independently extensible force exerting rods are required to apply force at a corresponding plurality of separate closely spaced locations within the area of a member or product to be formed.

Other advantages and applications of the present invention will be apparent from the following description and appended claims, reference being had to the accompanying drawings forming a part of this specification wherein like reference characters designate corresponding parts in the several views.

BRIEF DESCRIPTION OF THE DRAWINGS

FIG. 2 is a schematic reduced plan view showing the arrangement of the high pressure cylinders and guide and locking rods of the press of FIG. 1.

FIG. 3 is a schematic fragmentary view similar to FIG. 1, but showing the carrier after a stripping operation immediately following a high tonnage clamping operation.

FIG. 4 is a schematic side elevational view showing the FIG. 1 press at its open position.

Figure 1:
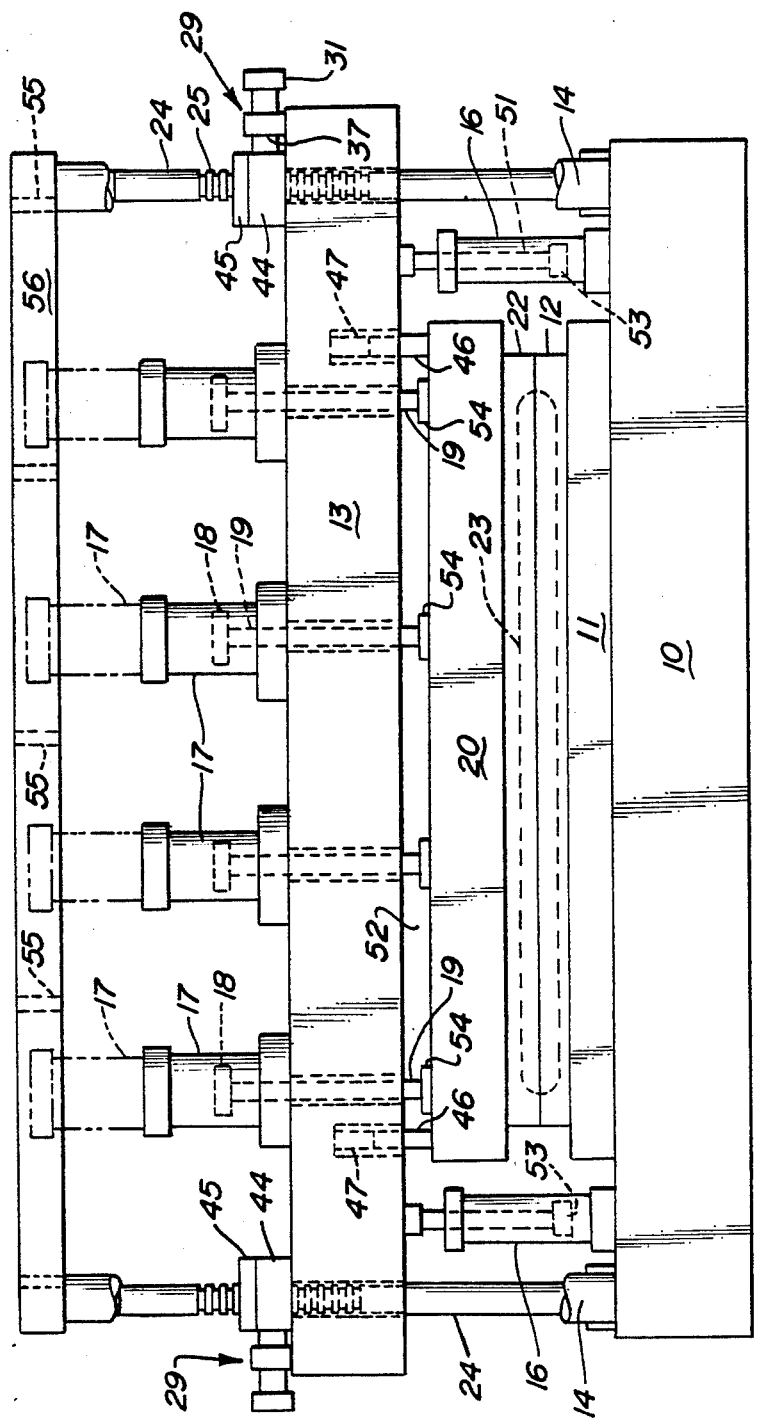
FIG. 1 is a schematic front elevational view of a high pressure RIM press embodying the present invention, showing the press at its locked and closed clamping position.

It is to be understood that the invention is not limited in its application to the specific details described herein, since the invention is capable of other embodiments and of being practiced or carried out in various ways, and that the phraseology or terminology employed herein is for the purpose of describing the invention claimed in the appended claims.

DESCRIPTION OF A PREFERRED EMBODIMENT OF THE INVENTION

Referring to the drawings, a high pressure press for reaction injection molding (RIM) on the order of 500 to 1000 tons or more capacity, and for high pressure stripping of the mold parts after the RIM process, is illustrated comprising in the present instance a rigid fixed base 10 supporting and secured to a lower fixed mold plate 11. A lower fixed mold part 12 is supported and suitably secured by conventional means, not shown, to the plate 11. A movable carrier 13 of rigid material is provided with sleeve bushings that ride along four guide pillars 14, FIGS. 2 and 4, extending upright from mountings on the base 10 adjacent to its corners and outwardly of the mold plate 11. A pair of comparatively high speed hydraulic assemblies including cylinders 16 mounted on the midline of the base 10 engage endwise extensions of the carrier 13 for rapidly moving the latter in sliding relationship along the guides 14 between an elevated open position, FIG. 4, and a lower clamping position, FIG. 1, as described below.

Mounted on the upper surface of the carrier 13 are a plurality of high pressure hydraulic cylinders 17, eight in the present instance, FIG. 2. Each cylinder 17 contains a bidirectionally operated piston 18 connected with a vertically movable connecting rod or connector 19 that extends in sliding sealing relationship through the lower end of the associated cylinder 17 and freely through the carrier 13 to a connection 54 at its lower end with a movable upper mold plate 20 for supporting the latter and moving it vertically in high pressure clamping and stripping operations upon actuation of the pistons 18. The plate 20 of rigid material is essentially coextensive with the underlying mold plate 11. An upper movable mold part 22, suitably secured detachably to the plate 20 by conventional means, not shown, overlies and cooperates with the lower mold part 12 at the closed position to complete a mold, indicated at 23, FIG. 1, which necessarily must be sealed during a molding operation.

Also mounted on the base 10 adjacent to and slightly inwardly of the guide pillars 14 respectively, FIG. 4, are four vertical locking rods 24 that extend freely through the carrier 13 and provide annular grooves or serrations 25 throughout their upper portions. The parts described thus far may be formed from sturdy structural steel alloys. The cylinders 16 and 17 are connected in an operative hydraulic circuit, not shown, and both may be operated by the same high pressure hydraulic fluid.

Figure 5:
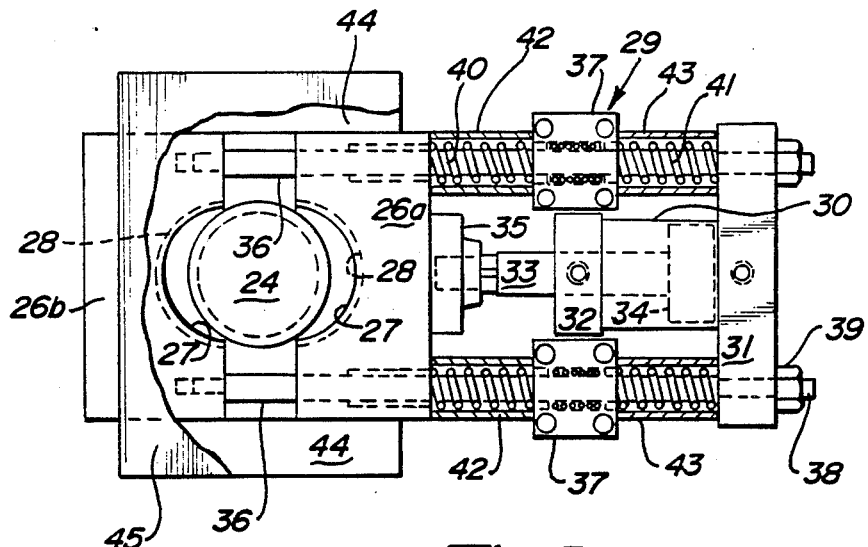
FIG. 5 and 6 are schematic enlarged plan views showing one of the locking assemblies for the movable carrier in the unlocked and locked positions respectively.
Figure 6:
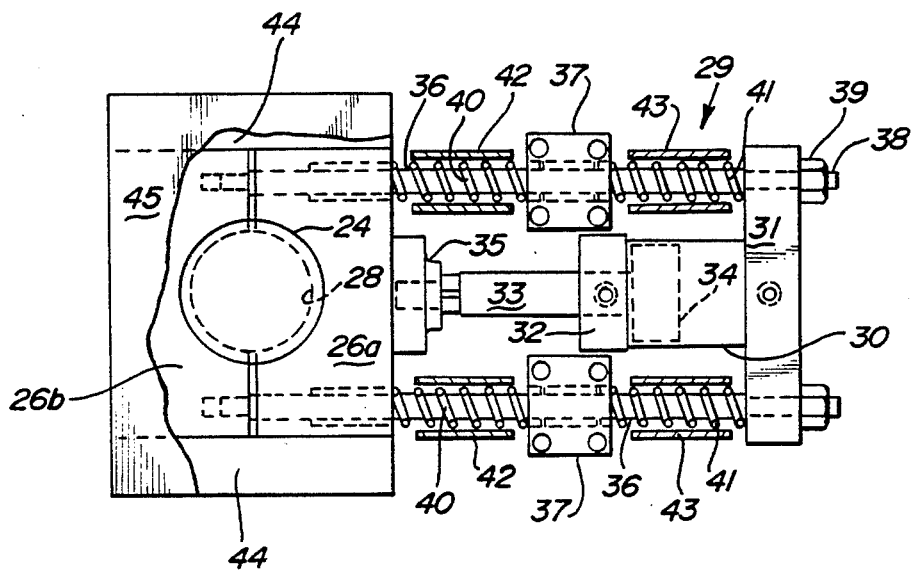

Associated with each rod 24 is a pair of locking dogs 26a, 26b, FIGS. 5 and 6, slideably mounted on the upper surface of carrier 13 for horizontal movement toward and from opposite sides of the associated rod 24. The dogs 26a,b are provided with semicylindrical recesses 27 serrated at 28 to mate and interlock with the serrations 25 when the dogs 26a,b are moved into locking engagement with the rods 24, FIG. 6. Movement of each pair of dogs 26a,b to and from the locking position is accomplished by an associated spring assisted hydraulic means indicated generally at 29, FIG. 1, comprising a horizontally movable hydraulic cylinder 30 closed at its outer end and secured thereat integrally to a horizontal transverse bar 31, FIGS. 5 and 6. The cylinder 30 is also closed at its inner end and secured thereat integrally to a guide 32 for a piston rod 33 connected to a piston 34 reciprocable within the cylinder 30. The rod 33 extends horizontally from the piston 34 and normally to the transverse bar 31 along an extension of a diameter of the associated rod 24 and slideably through the guide 32 in sealing relationship to a connection 35 at its inner end with the adjacent dog 26a.

A pair of rods 36 parallel to the rod 33 are connected with the other dog 26b at opposite sides of the rod 24 and extend outwardly in guided sliding relationship through the dog 26a and a pair of fixed guides 37 respectively that are secured to the carrier 13, and then to screw threaded ends 38 secured to the opposite ends of the bar 31 by nuts 39. Extending around the rods 36 are a pair of helical springs 40, compressible between the dog 26a and fixed guides 37, and a second pair of helical springs 41 compressible between the guides 37 and bar 31. The piston-cylinder assembly 29 is selectively operated by hydraulic circuitry (not shown) for applying hydraulic pressure to either the left or right face of piston 34.

When pressure is applied to the left face of piston 34, the latter is moved to the FIG. 5 position at the limit of its rightward movement within cylinder 30, thereby to move the dog 26a rightward to the FIG. 5 position and out of engagement with the rod 24. Simultaneously the cylinder 30 and connected bars 31 and 32 are moved leftward, thereby to move the rods 36 leftward and to force the dog 26b leftward out of engagement with the rod 24, FIG. 5. The simultaneous rightward movement of dog 26a and leftward movement of bar 31 compresses the springs 40 and 41 respectively between the dog 26a and guides 37 and between guides 37 and bar 31. Thus each dog 26a and 26b moves away from the locking rod 24 to the FIG. 5 unlocked position by an amount equal to one-half the total stroke or relative movement between the piston 34 and its cylinder 30, i.e., the piston 34 and cylinder 30 each move a half stroke in opposite directions relative to the fixed supports 37.

In order to assure the half stroke movement of the cylinder 30 and piston 34, a pair of tubular spacers 42 and 43 of equal lengths enclose respectively each pair of springs 40 and 41 and are located respectively between the guides 37 and dog 26a and between the guides 37 and bar 31. The tubular spacers 42 and 43 closely space the fixed guides 37 equal distances from the adjacent portions of the dog 26a and bar 31 when the mechanism 29 is at the FIG. 5 unlocked position. At the FIG. 6 locked position, the spacers 42, 43 float on their respective springs 40, 41.

Upon application of pressure to the right face of piston 34, or preferably upon release of pressure within cylinder 30, the compressed springs 40 move the dog 26a leftward to the locked position, FIG. 6 and the compressed springs 41 move the bar 31 and connected dog 26b rightward to the locked position, whereat the interfitting serrations 25, 28 of the rod 24 and dogs 26a,b lock the carrier 13 against movement longitudinally of the rod 24. The locking mechanism described is fail safe in the event of loss of pressure. In addition to the guides 37 secured to the carrier 13, a pair of fixed guides 44 secured to the carrier 13 in parallelism with the rods 36 engage opposite sides of the dogs 26a,b in sliding guided relationship to enable their horizontal movements to and from their locking positions as described.

Vertical movement of the dogs 26a,b independently of the carrier 13 is prevented by a plate 45 that overlies and is secured to the fixed guides 44. The locking rods 24 pass freely through openings in the plate 45, and each plate 45 closely overlies in sliding relationship the dogs 26a,b that slide between the guides 44 to which it is secured. The vertical dimension of each dog 26a,b will be seven or eight inches for a 1000 ton press in order to provide the strength to withstand the high tonnage clamping force in the locked position. Accordingly a second pair of rods 36 and associated structures preferably underlie the rods 36, although the underlying rods 36 are not shown in the plan views of FIGS. 5 and 6.

In accordance with a typical operation of the RIM press, starting by way of example from an elevated or mold open position of the carrier 13, FIG. 4, with the piston rods 51 of the cylinders 16 extended essentially to their limits of upward movement, the dogs 26a,b interlocked with the locking rods 24, and the pistons 18 retracted upwardly to support the plate 20 adjacent to its upper limit of movement within the clearance 52 between the plate 20 and carrier 13, the locking assemblies 29 may then be operated as described to release the dogs 26a,b from the serrated rods 24. The fluid in cylinders 16 holding the rods 51 at their extended positons is then released to enable downward movement of the heavy carrier 13 and the plate 20 by gravity to the closed position whereat the mold parts 12 and 22 interfit with each other in mating relationship, substantially as in FIG. 1. Proper alignment and mating of the mold parts 12 and 22 is assured by a plurality of locating pins 46 carried by plate 20 for closely interfitting within cylindrical bushings 47 in the carrier 13 when the plate 20 is at the positions of FIGS. 1 or 3.

The downward gravity movement of the carrier 13 and heavy structure carried thereby may be controlled conventionally by controlling the rate of flow of hydraulic fluid from below the pistons 53 within the cylinders 16. Alternatively, where high speed closing is desired, the cylinders 16 may be pressurized to drive the pistons 53 downward. Inasmuch as the mating mold parts 12, 22 may be replaced by other mold parts of different sizes for different molding operations, the serrations 25 of the carrier 13 at the initial closed position may not be aligned with the serrations 28 of the dogs 26a,b. Accordingly, before actuation of the locking mechanisms 29, the fluid pressures in cylinders 16 and 17 will be controlled to raise the carrier 13 to the next successive locking position, FIG. 1, whereat the serrations 25, 28 are aligned. During this operation, the spacing 52 will increase slightly, usually less than an inch, but not more than the spacing between successive locking positions, and the plate 20 and mold part 22 will remain at the closed FIG. 1 position.

For each molding operation, the proper locking position is preselected from one of a plurality of locations spaced vertically by increments on the order of magnitude of a little more than an inch and equal to the incremental spacing between successive locations at which the serrations 28 of the dogs 26a,b interlock with the serrations 25 of the rods 24. When the serrations 25 and 28 are aligned for interfitting in locking engagement, the mechanisms 29 may be actuated to move all of the dogs 26a,b into such engagement with their rods 24 to lock the carrier 13 against further movement during the subsequent high tonnage press operation effected by the high pressure force exerting assembles 17, 18, 19. A sufficient number of the serrations 25, 28, usually about six, will be interlocked at the FIG. 6 locking position to withstand the high tonnage clamping and molding force.

By way of an alternative operation, the mold parts 12, 22 of different sizes for different molding operations may be dimensioned in the aforesaid increments so that when the plate 20 is lowered to the closed position, the carrier 13 will be in a position whereat the serrations 25 and 28 interfit. In that situation, the locking mechanisms 29 may be actuated to interlock the serrations 25, 28 immediately after the plate 20 reaches the closed position, and the above described clamping action may be initiated immediately thereafter.

After the carrier 13 is locked against vertical movement, the assemblies 17-19 are actuated to provide a high pressure differential across the pistons 18 to force them and the connecting rods 19 downwardly against the plate 20 with high tonnage force. The plate 20 is thus forced downwardly toward the plate 11, FIG. 1, to clamp the mating mold parts 12, 22 tightly together in preparation for the RIM operation.

By virtue of the cylinders 17 mounted on and moveable with the carrier 13 to the FIG. 1 locking position, whereat the plate 20 and movable mold part 22 are at the final clamping position, the connectors 19 need not move to effect their tonnage clamping force against the plate 20. Consequently a minimum quantity of high pressure hydraulic fluid is required for the mold clamping. Also the short extension of each connector 19 below the carrier 13 does not subject the connectors 19 to significant bowing or deformation during the high tonnage molding operation.

After the mold parts 12,22 are clamped together by operation of the cylinders 17, the chemicals to be reacted and molded are then injected under high pressure into the mold 23 in accordance with conventional RIM practice. The molding pressure is greatly increased as the chemicals react to provide the resultant moldable product. Upon completion of the RIM, the high pressure differential across the pistons 18 may be reversed to effect high tonnage stripping, where required, to move the plate 20 upwardly within the clearance 52, FIG. 3, thereby to strip the mold part 22 from the molded product within the mold 23. FIG. 3 may illustrate the situation wherein the mold parts 12,22 are dimensioned such that when they are at their closed interfitting positions, the serrations 25,28 will also interfit at one of the incremental positions. Sufficient space 52 between plate 20 and carrier 13 will necessarily be provided in that situation so that after the high tonnage molding operation and prior to unlocking the dogs 26a,b from the rods 24, the cylinders 17 may be actuated to raise the plate 20 and connected mold part 22 to effect high tonnage stripping. When the stripping is completed, the cylinders 16 are pressurized sufficiently to relieve the vertical force against the dogs 26a,b resulting from the weight of carrier 13. The locking assemblies 29 are then actuated to unlock the dogs 26a,b from the rods 24. The high speed cylinders 16 may then be activated to return the carrier 13 to its elevated starting position.

The stripping force is usually less than the 1000 ton molding force, as for example in the neighborhood of 200 tons, but it is an appreciable force nevertheless. Preferably when high stripping force is not required, as for example less than 200 tons, the rods 24 may be unlocked from the dogs 26a,b after the RIM operation and the cylinders 16 may then be activated to effect the stripping. Uniform and simultaneous stripping movement of all parts of the plate 20 is thus facilitated because it is easier to control the stripping operation of the two cylinders 16 than the eight or more cylinders 17.

As noted above, a major problem confronted by high tonnage RIM presses results from deformation of the press components during the high pressure clamping force required to overcome the reaction pressure of the molding products. The present invention mounts the high tonnage pressure exerting cylinders 17 on the carrier 13 at preselected locations spaced within an area coextensive with the area of the mold 23, FIG. 2, such that at least some of the connectors 19 engage the plate 20 within that area. The connectors 19 are forced independently of each other against the plate 20 by means of the high pressure fluid within the cylinders 17. Thus any localized unsealed juncture between the mold parts 12, 22 resulting from deformation of the press components, such as bowing of the carrier 13 and base 10, or relative cocking therebetween resulting from the clamping force on the corner mounted locking rods 24, or their non-uniform stretching, and from pressure within the mold 23, will be closed by additional downward movement of the connecting rod 19 overlying the unsealed juncture.

The high tonnage downward extension of each rod 19 continues until all the junctures between the mold parts 12, 22 are compacted firmly together and sealed. The mold parts 12, 22 are necessarily sufficiently strong to resist being crushed by the forces exerted by the high pressure assemblies 17, 18, 19, which forces may amount to approximately 125 tons at each location 54 where the force of a 1000 ton press is distributed among eight rods 19. The condition whereat the mold parts 12, 22 are pressed together sufficiently to complete the desired sealed mold 23 determines the limit of downward movement of the connecting rods 19. The pressure within the cylinders 17 is then maintained to hold the mold 23 closed until completion of the molding reaction, whereupon the press components are returned to the starting position as described above.

The FIG. 1 press may operate at pressures in the cylinders 17 on the order of magnitude of 2500 psi for example, wherein the plan area of the mold 23, FIG. 2, may be on the order of magnitude of 6 feet by 9 feet by way of example. The spacing between the connections 54 of the connectors 19 with the plate 20 will be determined by the rigidity of the plate 20, but in any event will be sufficiently small so that the leverage of localized deforming forces exerted on the mold plates 11 and 20 between the locations 54 will be too small to enable significant deformation of these plates between adjacent regions 54. It is accordingly apparent that the independently extensible connectors 19 not only compensate for deformation of the press components, they may actually suppress deformation by preventing initial buckling of such parts as the plates 11 and 20. Even when the four locking rods 24 do not stretch identically, or in the event of slight deformation of the heavy base 10, the action of the independently extensible rods 19 described above will maintain the mold 23 closed and sealed throughout the molding operation.

It is to be noted that the locking rods 24 sustain all of the reaction force of the high tonnage clamping operation, such that the functions of the guide rods or pillars 14 in guiding the movable carrier 13 is unhampered. Also the locking engagement between the rods 24 and assemblies 29 is outward of the plan area of the plates 11 and 20, such that locating of the cylinders 17 within that area is unrestricted, enabling the cylinders 17 to be arranged as closely together as desired. Furthermore, by mounting the cylinders 17 above the carrier 13, the overall height of the press may be reduced because the tops of the cylinders 17 in the raised or open FIG. 4 position may fit between the parallel cross girders 55 that connect the upper front and rear beams 56 that in turn connect and support the upper ends of the front and rear pillars 14 respectively.

I claim:

1. A RIM press comprising a pair of mold plates movable with respect to each other to a clamping position, each plate providing one of a pair of mold parts cooperable to interfit and comprise a mold having a sealed reaction injection mold cavity therebetween when said plates are clamped toward each other at said clamping position, a carrier associated with one of said plates and movable with respect thereto to a locking position adjacent to said one plate at said clamping position, means operative for blocking movement of said carrier from said locking position force exerting means carried by said carrier for forcing said one plate toward said other plate at said clamping position comprising a plurality of connectors extensible independently of each other in the direction from said carrier toward said one plate for pressing thereagainst at a plurality of separate locations within the area of said mold when the latter is clamped between said plates, and means independent of said force exerting means for moving said mold plates with respect to each other to said clamping position.

2. A press according to claim 1, said force exerting means comprises means for urging said connectors against said one plate with high tonnage force, means for applying said tonnage force at each of said locations regardless of deformation of said plates comprising each connector being extensible independently of the others against said one plate at one of each of said separate location.

3. A press according to claim 1, said force exerting means also comprising separate means mounted on said carrier and associated with each connector respectively for applying force to urge extension of the associated connector independently of the others in said direction to press said connectors against said one plate at said locations.

4. A press according to claim 3, each separate means also comprising means selectively operative for forcing the associated connector oppositely from said direction for enabling a stripping operation, said connectors being operatively connected with said one plate to enable said stripping operation upon movement of said connectors in said opposite direction.

5. A press according to claim 3, said connectors being connected with said one plate at said locations respectively and also being operatively connected respectively with said separate means for selectively moving said one plate with said carrier.

6. A press according to claim 5, said separate means associated with each connector comprising high pressure fluid actuated means selectively operative for forcing the associated connector in said direction for enabling a molding operation and for forcing the associated connector oppositely from said direction for enabling a mold stripping operation.

7. A high pressure RIM press for forming an article in a mold comprising a pair of mold plates movable with respect to each other to a clamping position, each plate providing one of a pair of mold parts cooperable to interfit and comprise a mold having a sealed reaction injection mold cavity therebetween when said plates are clamped toward each other at said clamping position, a carrier associated with one of said plates and movable with respect thereto to a locking position adjacent to said one plate at said clamping position, means selectively operative for locking said carrier against movement at said locking position, means for clamping said plates toward each other in a high pressure clamping operation at said clamping position and for compensating for deformation of components of said press to assure predetermined formation of said article during said high pressure clamping operation comprising force exerting means carried by said carrier for clamping said one plate toward said other plate when said carrier is locked at said locking position, said force exerting means comprising a plurality of connectors independently extensible in the direction toward said one plate for pressing thereagainst at a plurality of separate locations within the area of said mold, and means independent of said force exerting means for moving said mold plates with respect to each other to said clamping position.

8. A press according to claim 7, said force exerting means also comprising separate means associated with each connector and mounted on said carrier for moving therewith, each separate means being operatively connected with its associated connectors for forcibly extending the latter in said direction.

9. A press according to claim 8, said separate means being selectively operative for forcibly extending said connectors independently of each other in said direction or the opposite, and said connectors being operatively connected with said one plate for forcing the latter in said direction or the opposite upon the operation of said separate means selectively for effecting high pressure molding or stripping operations.

10. A press according to claim 7, said force exerting means comprising separate means associated with said connectors respectively and operative for urging each connector in said direction against said one plate with high tonnage force.

11. A press according to claim 10, each separate means comprising a hydraulic cylinder mounted on said carrier, each connector comprising a piston actuated connecting rod extending from the associated cylinder through said carrier to its associated separate location and connected at said location with said one plate.

12. A press according to claim 7, said means for locking said carrier comprise a plurality of locking rods secured to a portion of said press fixed with respect to said other plate and extending therefrom at locations outwardly of the area of said mold in the direction of movement of said carrier to and from said locking position, the last named means also comprising an operative mechanism secured to said carrier, said locking rods and operative mechanism having means selectively interengageable upon operation of said operative mechanisms to lock said carrier and other plate against movement with respect to each other.

13. A press according to claim 12, each locking rod having a plurality of annular serrations along its length, said operative mechanism comprising a pair of dogs associated with each locking rod and mounted on said carrier for moving to and from positions of locking engagement with opposite sides of the associated rod, said dogs having serrated recesses for receiving said opposite sides and mating and interlocking with serrations of said rod at said positions of locking engagement, an operative fluid actuated piston-cylinder assembly comprising a piston member and a cylinder member mounted on said carrier and reciprocal with respect to each other in opposite directions upon selective operation of said assembly, and means connecting said members with said dogs respectively of said pair for moving the latter simultaneously in said opposite directions with respect to each other to and from said positions of locking engagement.

14. A press according to claim 12, a fixed base for said press, said other plate comprising a fixed plate supported by said base, said locking rods being secured to said base, guide pillars supported by said base and extending therefrom parallel to said locking rods at locations outwardly of said area, said pillars extending in sliding guiding relationship through said carrier.

15. A press according to claim 14, said force exerting means also comprising a plurality of high pressure cylinders mounted on said carrier within the area of said mold, said connectors comprising a plurality of piston actuated connecting rods extending coaxially from said cylinders respectively in said direction of movement of said carrier and being connected with said one plate at said locations respectively.

16. A press according to claim 15, said carrier having inner and outer surfaces proximate and remote from said base respectively, said cylinders being mounted on said outer surface and said connecting rods extending through said carrier to said one plate confronting said inner surface.

* * * * *